(12) United States Patent
Puri et al.

(10) Patent No.: US 8,671,401 B2
(45) Date of Patent: Mar. 11, 2014

(54) TILING ACROSS LOOP NESTS WITH POSSIBLE RECOMPUTATION

(75) Inventors: Siddhartha Puri, Sammamish, WA (US); Jaydeep P. Marathe, Raleigh, NC (US)

(73) Assignee: Microsoft Corporation, Redmond, WA (US)

( * ) Notice: Subject to any disclaimer, the term of this patent is extended or adjusted under 35 U.S.C. 154(b) by 1505 days.

(21) Appl. No.: 11/784,792

(22) Filed: Apr. 9, 2007

(65) Prior Publication Data
US 2008/0250401 A1 Oct. 9, 2008

(51) Int. Cl.
*G06F 9/45* (2006.01)

(52) U.S. Cl.
USPC ........... 717/160; 717/140; 717/150; 717/151; 717/157

(58) Field of Classification Search
None
See application file for complete search history.

(56) References Cited

U.S. PATENT DOCUMENTS

| | | | |
|---|---|---|---|
| 5,953,531 A | 9/1999 | Megiddo et al. | |
| 6,357,041 B1 | 3/2002 | Pingali et al. | |
| 6,374,403 B1 | 4/2002 | Darte et al. | |
| 6,438,747 B1 | 8/2002 | Schreiber et al. | |
| 6,507,947 B1 * | 1/2003 | Schreiber et al. | 717/160 |
| 6,567,976 B1 | 5/2003 | Wolf | |
| 6,772,415 B1 | 8/2004 | Danckaert et al. | |
| 6,952,821 B2 | 10/2005 | Schreiber | |
| 7,140,009 B2 | 11/2006 | Tal et al. | |
| 7,313,787 B2 * | 12/2007 | Motokawa et al. | 717/150 |
| 8,056,065 B2 * | 11/2011 | Eichenberger et al. | 717/151 |
| 8,060,870 B2 * | 11/2011 | Eichenberger et al. | 717/160 |
| 8,087,011 B2 * | 12/2011 | Eichenberger et al. | 717/151 |
| 8,132,163 B2 * | 3/2012 | Tal et al. | 717/160 |
| 8,146,070 B2 * | 3/2012 | Archambault et al. | 717/157 |
| 8,214,816 B2 * | 7/2012 | Chen et al. | 717/157 |
| 2005/0283773 A1 * | 12/2005 | Eichenberger et al. | 717/151 |
| 2006/0048121 A1 | 3/2006 | Blainey et al. | |
| 2006/0048122 A1 | 3/2006 | Barton et al. | |
| 2006/0098019 A1 * | 5/2006 | Tarditi et al. | 345/505 |
| 2007/0169059 A1 * | 7/2007 | Halambi et al. | 717/160 |
| 2009/0083724 A1 * | 3/2009 | Eichenberger et al. | 717/160 |
| 2009/0271772 A1 * | 10/2009 | Stephenson et al. | 717/145 |
| 2013/0036408 A1 * | 2/2013 | Auerbach et al. | 717/140 |

OTHER PUBLICATIONS

Bondhugula et al., Automatic mapping of nested loops to FPGAS, Mar. 2007, 11 pages.*
Li et al., Automatic tiling of iterative stencil loops, Nov. 2004, 54 pages.*
Ahmed et al., Tiling imperfectly-nested loop nests, Nov. 200, 14 pages.*

(Continued)

*Primary Examiner* — Thuy Dao
(74) *Attorney, Agent, or Firm* — Dan Choi; Carole Boelitz; Micky Minhas (57) ABSTRACT

Described is a technology by which a series of loop nests corresponding to source code are detected by a compiler, with the series of loop nests tiled together, (thereby increasing the ratio of cache hits to misses in a multi-processor environment). The compiler transforms the series of loop nests into a plurality of tile loops within a controller loop, including using dependency analysis to determine which results from a tile loop need to be pre-computed before another tile loop. For dependency analysis, the compiler may use a directed acyclic graph as a high-level intermediate representation, and split the graph into sub-graphs each representing an array. The compiler uses descriptors processed from the graph to determine the controller loop and the tile loops within that controller loop.

20 Claims, 4 Drawing Sheets

(56) References Cited

OTHER PUBLICATIONS

Ahmed, et al., "Tiling Imperfectly-nested Loop Nests", Date: 2000, IEEE Computer Society, Washington, DC, USA, http://delivery.acm.org/10.1145/380000/370401/a31-ahmed.pdf?key1=370401&key2=5519117611&coll=GUIDE&dl=GUIDE&CFID=9889163&CFTOKEN=38133579.

Jimenez, et al. "A cost-effective implementation of multilevel tiling", Date: Oct. 2003, vol. 14, No. 10, http://ieeexplore.ieee.org/iel5/71/27797/01239869.pdf?isNumber=.

Kwon, et al., "A Compiler Optimization to Reduce Execution Time of Loop Nest", Date: Mar. 1996, pp. 6-11, vol. 24, Issue 1, http://delivery.acm.org/10.1145/240000/232792/p6-kwon.pdf?key1=232792&key2=3729117611&coll=GUIDE&dl=GUIDE&CFID=9889163&CFTOKEN=38133579.

Song, et al., "New Tiling Techniques to Improve Cache Temporal Locality", Date: 1999, pp. 215-228, ACM Press, New York, USA, http://delivery.acm.org/10.1145/310000/301668/p215-song.pdf?key1=301668&key2=9739117611&coll=GUIDE&dl=GUIDE&CFID=9889163&CFTOKEN=38133579.

Cann, et al., "SISAL versus FORTRAN: a Comparison using the Livermore Loops," In Supercomputing '90: Proceedings of the 1990 conference on Supercomputing, Los Alamitos, CA, USA, 1990, pp. 626-636.

Cann, et al., "Advanced Array Optimizations for High Performance Functional Languages," IEEE Transactions on Parallel and Distributed Systems, vol. 6, No. 3, Mar. 1995, pp. 229-239.

Ding, et al., "Improving Effective Bandwidth through Compiler Enhancement of Global Cache Reuse," Retrieved Aug. 31, 2013 at <<http://ftp.cs.rochester.edu/u/cding/Documents/Publications/ipdps01.pdf>>, In the Proceedings of 2001 International Parallel and Distributed Processing Symposium, San Francisco, California, Apr. 2001 (IPDPS'01), 10 pages.

Guibas, et al., "Compilation and Delayed Evaluation in APL," In the Proceedings of the 5th ACM SIGACT-SIGPLAN Symposium on Principles of Programming Languages, 1978 (POPL '78), pp. 1-8.

Johnston, Ronald L., "The Dynamic Incremental Compiler of APL\3000," In Proceedings of the International Conference on APL: part 1, Jun. 1979 (APL '79), pp. 82-87.

Lewis, et al., "The Implementation and Evaluation of Fusion and Contraction in Array Languages," In Proceedings of the ACM SIGPLAN 1998 Conference on Programming Language Design and Implementation, May 1998 (PLDI '98), pp. 50-59.

Lim, et al., "Blocking and Array Contraction Across Arbitrarily Nested Loops Using Affine Partitioning," Proceedings of the Eighth ACM SIGPLAN Symposium on Principles and Practices of Parallel Programming, Jul. 2001 (PPoPP '01), 10 pages.

Scholz, Sven-Bodo, "Single Assignment C—Functional Programming Using Imperative Style," Retrieved Aug. 29, 2013 at <<http://www.google.com/search?sourceid=navclient&ie=UTF-8&rlz=1T4GGLL_enUS404US404&q=Functional+programming+using+imperative+style>>In Proceedings of the 6th International Workshop on Implementation of Functional Languages (IFL94) (1994), pp. 21.1-21.13.

Scholz, Sven-Bodo, "With-Loop-Folding in Sac—Condensing Consecutive Array Operations," Retrieved Aug. 29, 2013 at <<http://www.sac-home.org/publications/wlf-st-andrews-97.pdf>>, 9th International Workshop on Implementation of Functional Languages, 1997, pp. 72-91.

Tarditi, et al., "Accelerator: Using Data Parallelism to Program GPUs for General-Purpose Uses," Proceedings of the 12th International Conference on Architectural Support for Programming Languages and Operating Systems, San Jose, CA, USA—Oct. 21-25, 2006 (ASPLOS XII), pp. 325-335.

Wolf, et al., "A Data Locality Optimizing Algorithm," In Proceedings of the ACM SIGPLAN 1991 Conference on Programming Language Design and Implementation, 1991 (PLDI '91), pp. 30-44.

\* cited by examiner

TILING ACROSS LOOP NESTS WITH POSSIBLE RECOMPUTATION

BACKGROUND

As physical limitations are being reached in contemporary processor design, current technology is turning more and more to parallel processing to speed up computing. One way to accomplish parallel processing is to have developers write code designed for parallel operation. Another way to accomplish parallel processing (to an extent) is to have the program compiler locate code that can be parallelized, e.g., two sets of code that do not depend on execution order with respect to one another because neither set relies on the results of the other's execution. The compiler can then arrange such code for parallel execution in an appropriate multiprocessor machine.

In high-performance compilers, one standard optimization is "tiling" (also known as "blocking"), in which a loop nest is transformed into an equivalent loop nest of tiles with a different iteration order and better cache locality. For example, consider a program that includes code with a loop of ten-thousand iterations nested inside another loop of ten-thousand iterations, creating a ten-thousand by ten-thousand iteration space:

```
for (i = 0; i < 10000; i++) {
    for (j = 0; j < 10000; j++) {
        b[i,j] = a[i−1,j] + a[i,j] + a[i+1,j];
    }
}
```

Such a loop nest may be transformed into equivalent code having fewer iterations per loop, but with more nested loops, such as a one-hundred loop iteration nested within another one-hundred loop iteration that in turn is nested within another one-hundred loop iteration, which is yet nested within another one-hundred loop iteration. Example code for this equivalent loop nest is set forth below:

```
for (ii = 0; ii < 10000; ii += 100) {
    for (jj = 0; jj < 10000; jj += 100) {
        for (i = ii; i < ii + 100; i++) {
            for (j = jj; j < jj + 100; j++) {
                b[i,j] = a[i−1,j] + a[i,j] + a[i+1,j];
            }
        }
    }
}
```

The net effect of this transformation is to subdivide the ten-thousand by ten-thousand iteration space into one-hundred by one-hundred tiles, and proceed one tile at a time. Because the program exhibits two-dimensional memory locality, when using multiple processors, such tiling reduces overall memory traffic by increasing the number of cache hits. However, existing tiling approaches only consider one loop nest at a time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a series of loop nests corresponding to source code are detected by a compiler, with the series of loop nests tiled together, (thereby increasing the ratio of cache hits to misses in a multi-processor environment). The compiler thus detects a series of loop nests, and transforms the series of loop nests into a plurality of tile loops within a controller loop, including determining which results from at least one tile loop need to be pre-computed before another tile loop. To this end, the compiler performs a dependency analysis to determine which later tile depends on a previous tile.

In one example implementation, the compiler compiles source code into a high-level intermediate representation comprising a data structure (e.g., a directed acyclic graph) having nodes representing at least one array and at least one expression. The compiler analyzes the nodes of the data structure to generate analysis data (e.g., descriptors) representative of expression nodes, and separates the data structure into sub-parts at an array. The compiler then lowers the high-level intermediate representation into a low-level intermediate representation, including generating one or more controller loop for an array (sub-graph) and a plurality of tiles within at least one of the controller loops from the analysis data. A previous tile may need to be larger than a later tile, however recomputation of the values of tiles at boundaries is more efficient than requiring memory access due to a cache miss. The compiler may coalesce descriptors before generating the loops, and may widen the descriptors to avoid boundary violations.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards locating loop nests that follow one another in succession, and then tiling those loop nests together in a way that is far more efficient performance-wise when the code is executed. As will be understood, significant efficiency gains result from selecting tiles (that represent portions of loop nests) such that most data needed for processing a loop is already in the cache, rather than needing to be fetched from memory.

While much of the description herein is generally directed towards parallel computing using examples comprising regular, two-dimensional arrays for purposes of explanation, it will be understood that these examples are non-limiting, and that the technology described herein is applicable to arrays of more than two-dimensions, and/or may be generalized to irregular arrays. Further, while the examples are directed to perfect loop nests with no interdependencies between loops, the concepts may be extended to imperfect loop nests, such as by using known (e.g., Fortran-based) parallelizing techniques to convert imperfect loop nests to perfect loop nests, and then proceeding.

As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing in general.

Figure 1:
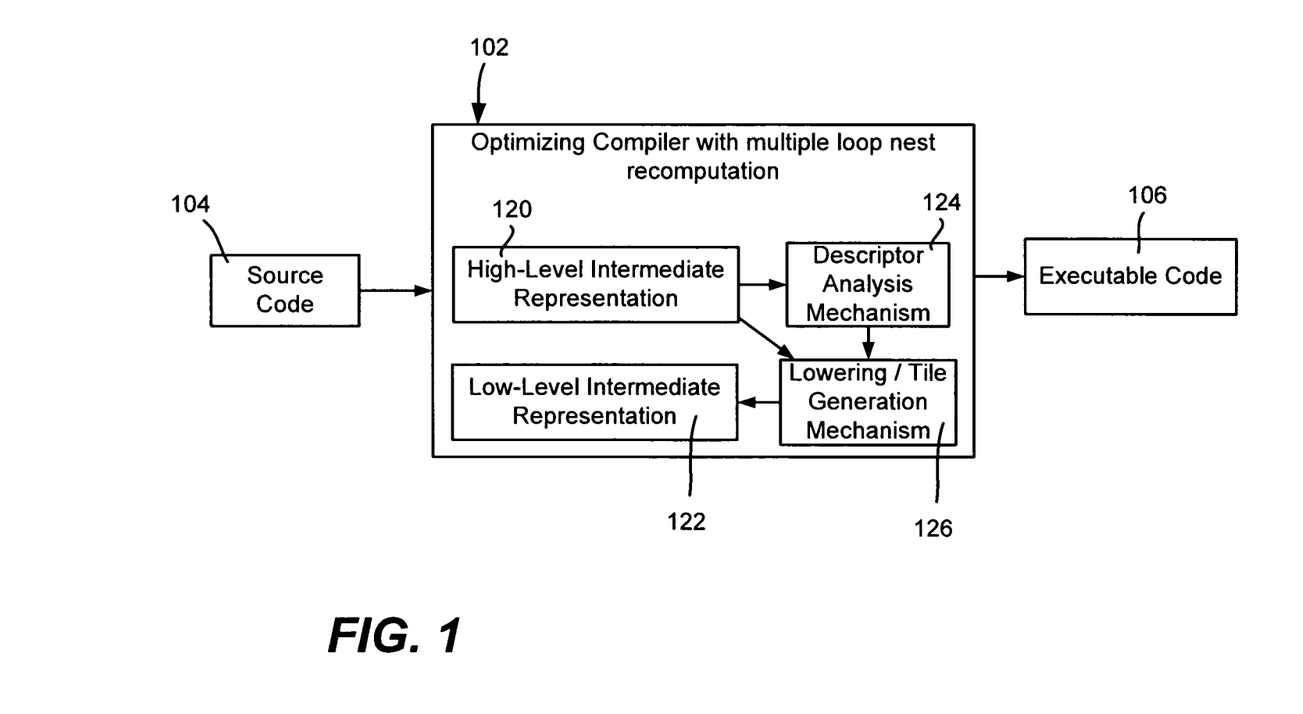
FIG. 1 is a block diagram representing an example compiler for producing executable code from source code, including by tiling across loop nests for efficient code execution.

Turning to FIG. 1, there is shown an optimizing compiler 102 that includes multiple loop nest/recomputation mechanisms as described below. In general, the example compiler 102 is of the type that dynamically translates source code 104 into executable code 106 in an operational computing device, e.g., a just in time (JIT) compiler. Note, however that any compiler, including more conventional static-type compilers may benefit from the technology described herein.

In general, among other compiler optimizations, as the compiler 102 compiles code 104, the compiler 102 looks for multiple loop nests that follow one another in succession. When found, the compiler may tile the loop nests together, as described below, whereby it is often possible to obtain far superior processing performance as a result of needed values being in the processor cache rather than needing to be fetched from memory.

Figure 2:
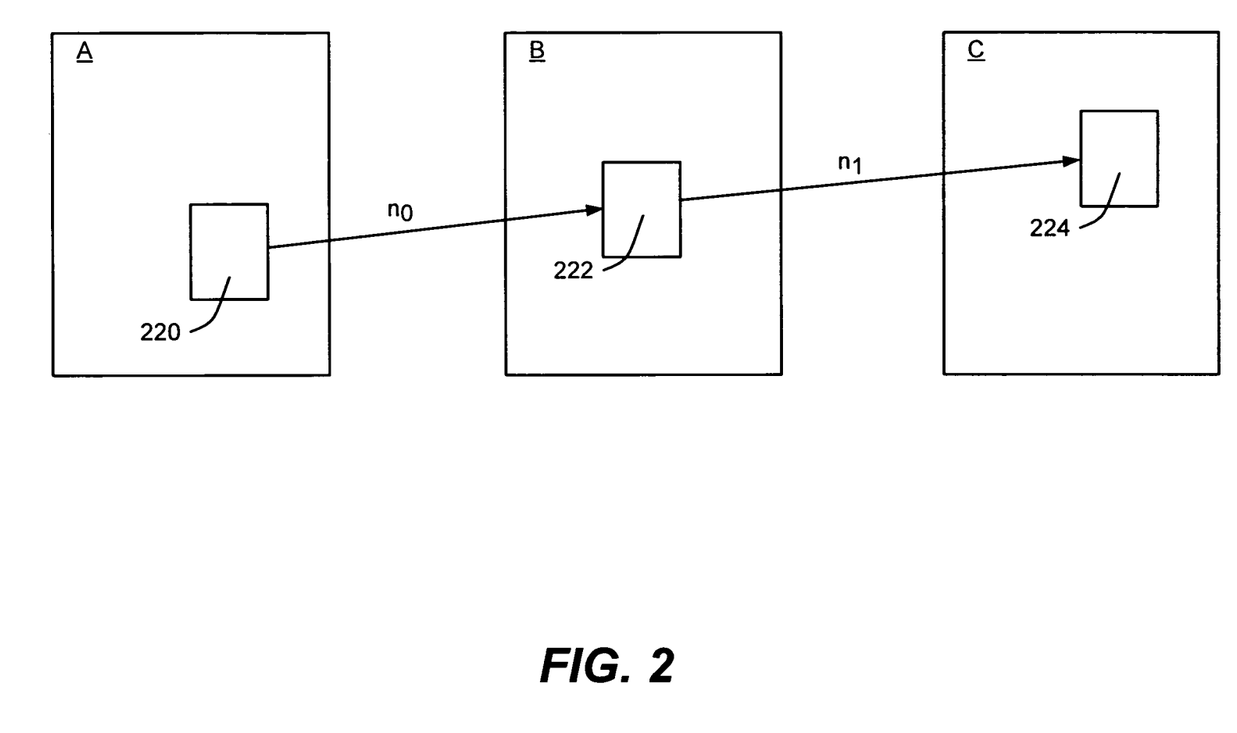
FIGS. 2 and 3 are representations of two-dimensional array being transformed into other arrays by tiling across loop nests.

FIG. 2 shows the concept of tiling multiple loop nests in a simplified form. For example, if a loop nest n0 operating on an array A computes an array B and the following loop nest n1 computes an array C that depends on B, it is far more memory-efficient to compute each tile (e.g., 222) of B (from a corresponding tile 220 in A) just when it is needed to compute the corresponding tile (e.g., 224) of C. If C's tile 224 is the only tile that depends on B, the tile 222 of B that has been computed can then be discarded, and need never be stored in memory, only in the processor cache.

Figure 3:
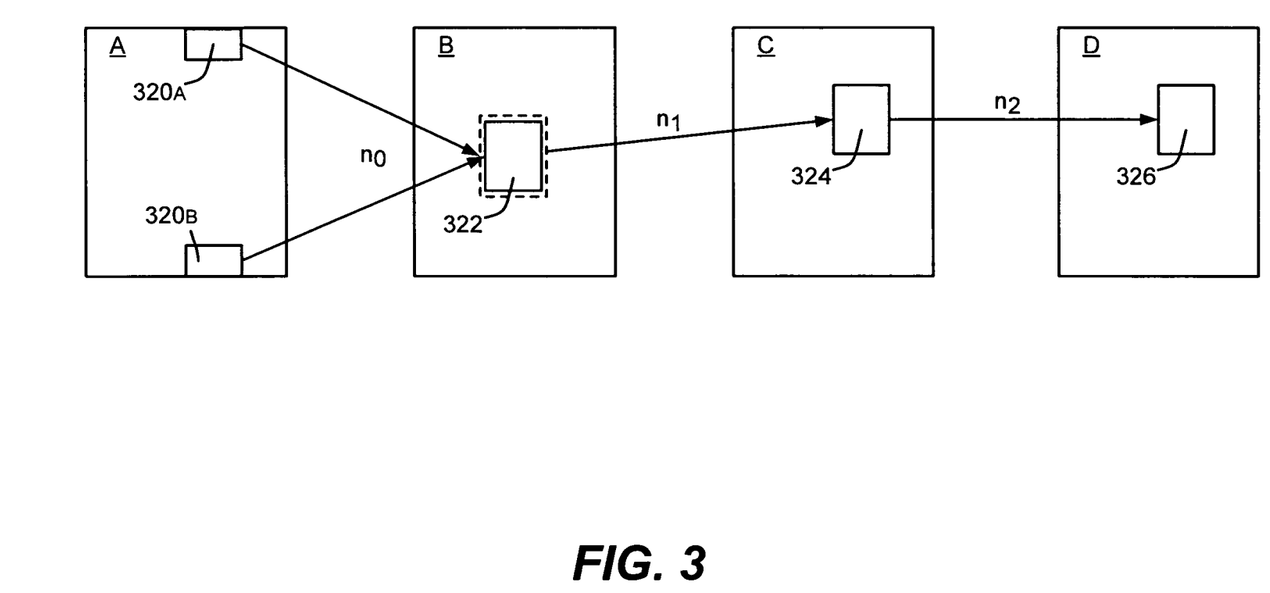

FIG. 3 shows the concept extended to three loop nests $n_0$-$n_2$, for arrays A-D with corresponding tiles 320A and 320B, 322, 324 and 326. Note that the intermediate tiles 322 and 324 may be discarded in this example. Further note that the tile 320A and 320B are in disjoint locations in the source array A, which may be because of a conditional operation that selects from among different source values.

Because this optimization is useful when the program has two-dimensional memory locality, it will often be the case that a given tile of C depends on a slightly larger tile of B, such as represented in FIG. 3 via the dashed box surrounding the tile 322. This means that some values of B (namely those that lie on tile boundaries) will be evaluated more than once, since they are needed for more than one tile of C. Note that this allows recomputation of temporary values, but does so in order to improve memory bandwidth requirements. In general, this means that the compiler has to perform some non-trivial dependence analysis (described below with reference to a descriptor analysis mechanism 124) in order to determine which results from earlier loop nests need to be pre-computed to satisfy the requirements of the last loop nest.

The result is equivalent to executing only the final loop nest, and computing the results of previous loop nests lazily (i.e., on demand). In this view, the optimization step that is provided herein is to determine at compile time which values will actually be demanded, and pre-compute them at run time and/or compile time.

Figure 4:
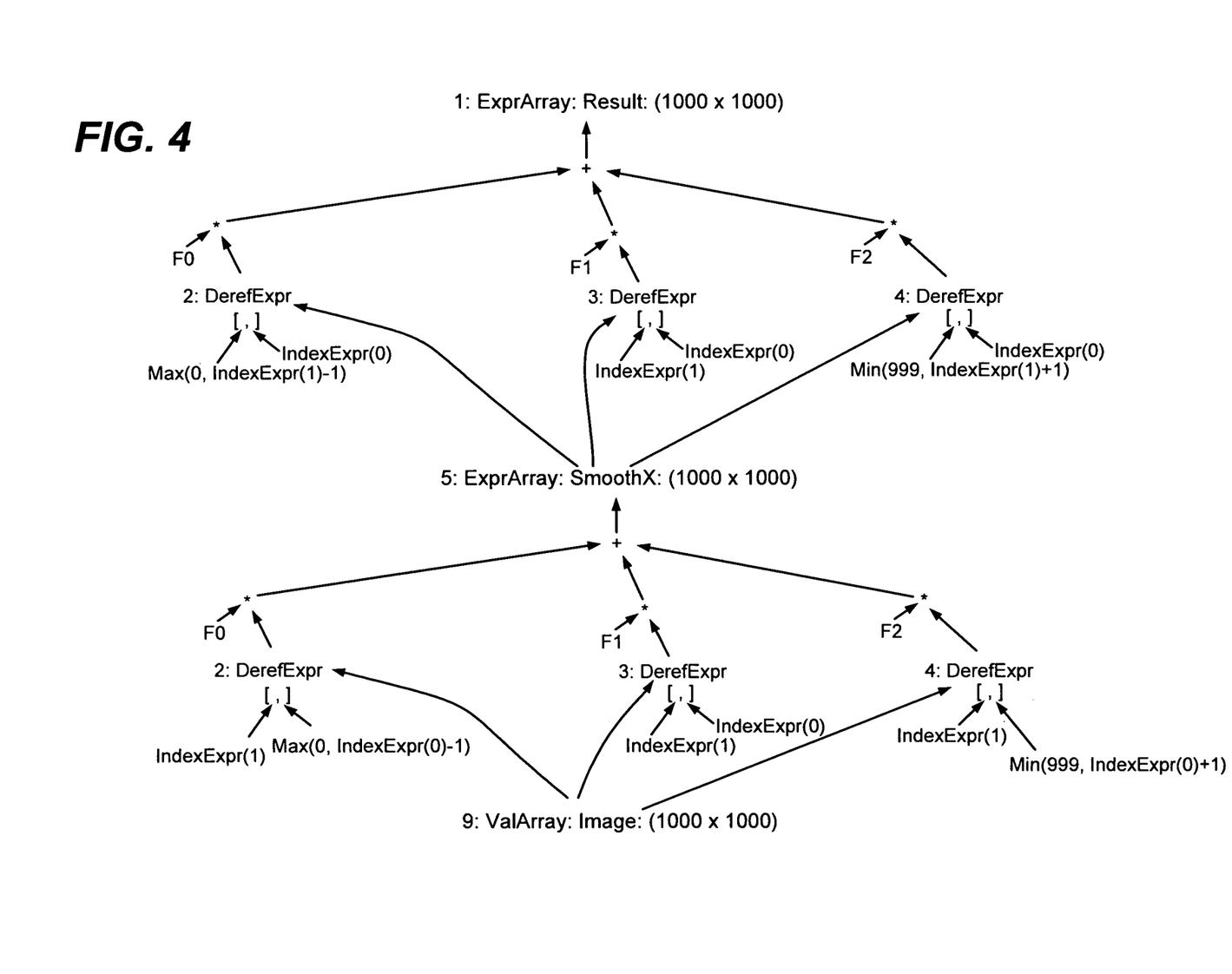
FIG. 4 is a representation of a data structure (e.g., a directed acyclic graph) that represents a higher level intermediate representation generated by the compiler for example source code.

Returning to FIG. 1, in one example implementation, the compiler 102 produces internal representations 120 and 122, the higher level of which corresponds to a high-level intermediate compilation language. Following optimizations, the higher-level intermediate representation 120 is translated to a lower-level intermediate representation 122, by a lowering/tile generation mechanism 126, described below. In an example implementation, the high-level representation 120 comprises a data structure, e.g., a directed acyclic graph as generally represented in FIG. 4. Note that the directed acyclic graph is analogous to an AST (abstract syntax tree), with a difference that nodes (e.g., node 5 in FIG. 4) whose values are used repeatedly are represented as having multiple parents. For compilation with respect to an array, the root of the graph is the result array that needs to be computed, and the leaves of the graph are the input arrays or constant scalar values.

Nodes in the higher-level intermediate representation 120 include arrays and expressions. Arrays comprise Value Arrays (ValArrays), Expression Arrays (ExprArrays) and Reduction Arrays (ReductionArrays). ValArrays are multidimensional arrays that have been allocated memory, and contain precomputed values. Input arrays are ValArrays.

ExprArrays and ReductionArrays represent intermediate array expressions that do not have a corresponding allocation of memory. During the compilation, the compiler 102 may choose to "instantiate" a particular ExprArray or ReductionArray node. Instantiation is achieved by allocating a ValArray of the same shape, computing the elements of the ExprArray/ReductionArray, and storing these values in the ValArray for later use by parents of the node. Note that the shape of an Array (e.g., Array P) is represented by a vector of length Rank(P), (where the Rank of an Array is the number of dimensions it has) such that shape[i]=size of the ith dimension of Array P (the size of an array is the total number of elements in the array, that is, the product of the array's extents). In other words, the shape of an array is determined by its rank and extents, and can be represented as a vector in which each element is the extent of the corresponding dimension.

ExprArrays ("expression arrays") represent a multi-dimensional, fixed-size abstract array. Each element of an ExprArray is a function of its position and its successor nodes of ExprArray in the directed acyclic graph. As described below, the function is represented by an arbitrary Expression node. ReductionArrays represent reductions by selected operations (e.g., min, sum, and so forth) on one or more dimensions of a target Array.

Expressions are of several different types. OpExpr represents arithmetic operations on one or more operands. ConstExpr represents constant values. IndexExpr denotes an integer variable which can range over a particular dimension (noted in the IndexExpr) of the nearest ancestor Array node. DerefExpr is used to dereference Array nodes, and contains a reference to the target Array, and a vector of integer Expressions. Each element of this vector gives the indexing function for a single dimension of the target Array.

After one or more optimization passes, a lowering pass (mechanism 126) of the compiler 102 translates the higher-level intermediate representation 120 into the lower-level intermediate representation 122. During translation, each ExprArray or ReductionArray E is "instantiated". Instantiation involves allocating a ValArray V such that shape(V)=shape(E), explicitly computing the elements of E using "loop" constructs, and storing these values in V. In the lower-level intermediate representation 122, the ValArrays (except the input and the result) are explicitly allocated and freed using "new" and "delete" statements.

As used as an example herein, a function named "Convolve" implements a two-dimensional convolution. The Convolve function takes as input a two-dimensional array of pixels representing an image, and a one-dimensional array of weights. The output is a two-dimensional array of pixels, where each pixel is a function of its neighboring pixels in the original image.

The C pseudo code for Convolve is given below, for a 1000×1000 example image size; (note the creation of the temporary array "smoothX" that saves the result of the horizontal convolution):

```
void Convolve(float Image[1000][1000],
              float kernel[3],
              float Result[1000][1000])
{
    //1. convolve in X direction
    float smoothX[1000][1000];
    for(int i=0; i < 1000;i++)
        for(int j=0;j < 1000;j++)
            smoothX[i,j]=Image[i][max(0,j-1)]*kernel[0]
            + Image[i][j]*kernel[1]
            + Image[i][min(999,j+1)]*kernel[2];
    //2. convolve in Y direction
    for(int i=0; i < 1000;i++)
        for(int j=0;j < 1000;j++)
            Result[i,j]= smoothX[max(0,i-1)][j]*kernel[0]
            + smoothX[i][j]*kernel[1]
            + smoothX[min(999,i+1)][j]*kernel[2];
}
```

This pseudo code may be represented in an alternative form; (note that the explicit indexing in the C pseudo code has been turned into equivalent Shift operations in the alternative version):

```
//dpImage is the 1000×1000 input image.
//1. Convolve in X direction.
ParallelArray<float> smoothX;
smoothX= dpImage.Shift(0,+1)
    + dpImage
    + dpImage.Shift(0,-1);
//2. Convolve in Y direction.
dpResult= smoothX.Shift(+1,0)
    + smoothX
    + smoothX.Shift(-1,0);
```

The higher-level intermediate representation 120 for this code after Inlining, Range Analysis and Simplification is shown in FIG. 4. The Inliner has already inlined the single-parent Array nodes. F0, F1 and F2 represent the weight values kernel[0], kernel[1] and kernel[2], respectively. In FIG. 4, arithmetic expressions (*,+) are shown symbolically, while DerefExpr and IndexExpr are shown explicitly.

Each DerefExpr has a list of integer Expressions, one for each dimension (subscript) of the target Array. Note that some of these Expressions have a "min"/"max" operation for preventing out of bound accesses. Initially, these Expressions had such bounds check operations, but the Simplifier was able to remove many of them using range information. The remaining bounds checks are shown in FIG. 4.

The lower-level intermediate representation 122 generated by the original lowering pass is show below as pseudo code. The floating point constants 0.05448868, 0.2442013 and 0.40262 are the values of F0, F1 and F2 respectively. Note the explicit allocation and deallocation for t0, which is the corresponding ValArray for SmoothX:

```
in float a0[1000,1000]; //Input: Image
out float r[1000,1000]; //Output: Result
new float t0[1000,1000]; //SmoothX
//1. Compute SmoothX
    loop (i < 1000)
        loop (j < 1000)
            t0[i,j] <- a0[i,max(0,j-1)] * 0.05448868
            + a0[i,j] * 0.2442013
            + a0[i,min(999,j+1)] * 0.40262;
//2. Compute Result
    loop (i < 1000)
        loop (j < 1000)
            r[i,j] <- t0[max(0,i-1),j] * 0.05448868
            + t0[i,j] * 0.2442013
            + t0[min(999,i+1),j] * 0.40262;
            free t0;
```

Simple parallelization of these nests does not scale to a large number of processors. Simple parallelization involves lowering the higher-level intermediate representation 120 graph in a bottom up manner, with each ExprArray and ReductionArray node completely instantiated before its parent Array nodes are processed. This leads to code which makes inefficient use of the memory hierarchy, if the size of the ExprArray/ReductionArray is larger than size of the last level of cache. In such an event, by the time the elements of the instantiated Array are referenced during the computation of its parent Arrays, they are no longer in the cache, but in memory. Because memory accesses take much longer than cache accesses, the processor stalls waiting for the data to become available from memory. In addition, instantiating the Array is an expensive operation, because it involves two separate bus events; first, the memory line being written to is brought into cache, and second, a write back transaction occurs when the dirty line is flushed out of cache. Thus, simple parallelization approach has high bus bandwidth requirements. For a small number of processors, the available bus bandwidth is sufficient. However, with increasing number of processors, contention for the bus increases beyond the available bus bandwidth.

To attempt to minimize the amount of redundant calculations, while also avoiding having to completely instantiate Array nodes as far as possible, a tiling optimization is performed. More particularly, to minimize the number of Array nodes that need to be fully instantiated the original the higher-level intermediate representation 120 data structure (e.g., the directed acyclic graph) is split into sub-parts (sub-graphs) by placing "break" marks at certain Array nodes, referred to herein as "break Nodes". In other words, in the example shown, the breaks split the original directed acyclic graph into sub-graphs, whose roots are the break nodes.

Break nodes are completely instantiated before their parent nodes are processed. However, the remaining Array nodes need not be completely instantiated. Instead, the computation for a break node is done in a tiled fashion. For each non-break Array node in the sub-graph, only the elements required for the current tile are instantiated. If the tile size is small, these elements tend to be available in the processor cache when referenced again in the computation of their parent Arrays.

Additional, the indexing expressions for the non-break Array nodes are modified, so that the same piece of memory can be reused for the processing of multiple tiles. Again, if the tiles are small enough, this memory will never be flushed out of cache, and so the writeback transactions for the dirty blocks will not be needed. This not only improves the miss rate (since data will tend to be in cache when referenced), but also reduces the bus bandwidth requirements, allowing the program to scale to larger number of threads. Further, the computation is parellelized by using multiple threads to process different tiles in parallel. The non-break Array elements are private to each block, i.e., their values are not reused across the processing of blocks. Thus, each thread allocates memory for storing its version of the non-break Array elements.

Turning to an explanation of the general operation, in general and as represented in FIG. 1, the compiler includes two steps/mechanisms 124 and 126, Descriptor Analysis and Tiled Lower-level Intermediate Representation Generation, respectively. Descriptor Analysis 124 determines where to place the breaks, and determines which elements of the non-break Arrays need to be created. Tiled Lower-level Intermediate Representation Generation 126 generates the tiled loop nest in the lower-level intermediate representation 122 for the calculations in each sub-graph rooted by a break node.

With respect to Descriptor Analysis, a "descriptor" denotes a range of integer values; in the context of an Array subscript (dimension), a descriptor denotes the range of values of that subscript that need to be created. The input to the descriptor analysis mechanism 124 (FIG. 1) is the higher-level intermediate representation 120, in this example comprising the directed acyclic graph (FIG. 4). Letting V denote the set of Array nodes in this directed acyclic graph, a first output is the set BREAKSET, a subset of V, containing the Array nodes where a break should be placed. A second output is a mapping DESCMAP: E to D, such that E is not an element of the set BREAKSET, E is an element of set V, and D is vector of descriptors, with length=Rank(E). For each non-break Array E, the mapping describes the range of its dimensions (subscripts) that need to be produced. Each element of D describes the range for exactly one dimension of E. D[i] is referred to as the "coalesced descriptor" for subscript i, because it is the union of the ranges in subscript i required by all parents of E.

A is an Array node to place a break, with $i_m$, ($0<=m<Rank(A)$) denoting an index variable for the mth dimension of A. Then, a descriptor D is defined as:

$$D=(\text{Index}+\{C_{min},C_{max}\},A)$$

where Index=ix,$0<=x<Rank(A)$|null.

Cmin and Cmax are integer constants. When Index is null, the Descriptor denotes a constant range of values from $C_{min}$ to $C_{max}$. When Index is not null, the descriptor denotes a range of values relative to the particular index variable, from $i_x+C_{min}$ to $i_x+C_{max}$. The descriptor also has an explicit reference to the break node A, which is used to decide whether two descriptors can be legally combined. Note that in one example implementation, the descriptor mechanism 124 is sufficient to describe expressions such as 2, $i_1$ and $i_1+2$; however, it cannot express more complicated expressions such as $2i_1$ (non-unity coefficient) or $i_1+i_2$ (multiple index variables). If an access pattern cannot be represented by the descriptor mechanism 124, that descriptor is given the special value of "*". Thus the complete definition of a descriptor is:

$$D=*\cup(\text{Index}+\{C_{min},C_{max}\},A)$$

where Index=$i_x$,$0<=x<Rank(A)$|null and $C_{min}$, $C_{max}$ are integer constants. For example, the descriptor ($i_1+\{-1,2\}$,A) denotes four accesses: $i_1-1$, $i_1$, $i_1+1$, $i_1+2$, where $i_1$ is the index variable for the 1st dimension of the break Array A.

Descriptor analysis takes a "greedy" approach to placing the breaks in the higher-level intermediate representation 120 (e.g., the directed acyclic graph of FIG. 4). Descriptor analysis is invoked with the root node R of the higher-level intermediate representation 120.

The descriptor analysis algorithm processes Array nodes and Expression nodes differently. Array nodes are processed in top-down order, e.g., all parent nodes of an Array node are processed before the Array. This is because to calculate the descriptor vector D for an Array node, it needs to be known which elements of the Array will be needed by all its parents. The vector D will be calculated from this information. For Expression nodes, the processing is bottom-up, because the descriptor of an Expression depends on the descriptors of its operands. When processing Expressions, the value of the current break Array is passed as a parameter, because it is needed when creating new Descriptors. DerefExpr nodes collect the descriptors for each subscript of their target Array and save this vector.

When an ExprArray node is processed, there is an attempt to coalesce the descriptors for each dimension from all its parent nodes. If the coalescing succeeds, the ExprArray is made into a non-break Array, and processing continues. If coalescing fails, a break is placed at the current Array, and processing restarts with this Array as the new break node.

With respect to processing Expression nodes, for integer ConstExpr expressions with constant C, the result descriptor is the constant descriptor {null+{C,C},B}. In the higher-level intermediate representation 120, IndexExpr expressions refer to dimensions of their nearest ancestor Array node. For these nodes, the result descriptor is the descriptor for the particular dimension of this Array, which is provided by the Iter vector parameter in the pseudo-code. Integer operations "+" and "−" take two operands, and the result operand calculated by applying the particular operation to the descriptors of the two operands as described.

Example pseudo code for the descriptor analysis pass is set forth below:

```
Descriptor doanalysis(Array B, Descriptor[ ] Iter,
                                  Integer[ ] shape)
{
Returns: Descriptor Result
Inputs:
1. B: Current break Array
2. Iter[i] = Descriptors for ith dimension of nearest
ancestor array.
3. Shape[i] = Size of ith dimension of B.
Global Outputs:
BreakSet: Array nodes to break at.
DescMap: Map from Array -> Descriptor[ ]
Temporaries:
ArrayEdgeMap: For each Array node,
contains Descriptor vectors for each parent nodes.
//Processing for Expressions
Case: ConstExpr(C) && typeof(C) == Integer
{
   //create a new descriptor
   Result = { null + {C,C},B}
}
Case: IndexExpr(position)
{
   //look up the descriptor
   Result = Iter[position];
}
Case: OpExpr(Operator, op1, op2)
          && typeof(op1) == typeof(op2) == Integer
          && Operator = { "+" | "−" | "min" | "max"}
{
   d1 = op1.doanalysis(B, Iter, shape)
   d2 = op2.doanalysis(B, Iter, shape)
   Case: d1 == "*" or d2 == "*"
      Result = "*";
```

```
Case: Operator == "+"
    Result = AddDescriptor(d1,d2);
Case: Operator == "-"
    {
        d2 = MultiplyDescriptorByConstant(-1,d2);
        Result = AddDescriptor(d1,d2);
    }
Case: Operator == "min"
{
    Case:     d1.IsConstantRange( )
        && d2.IsConstantRange( )
        Result = {null +
            {min(d1.Cmin,d2.Cmin),
             max(d1.Cmax,d2.Cmax),
            },B}
    Case: d1.IsSingleConstant( )
    {
        Result = d2;
        //** Descriptor Widening
        //bounding value
        Let boundval = d1.Cmin;
        //MAXIMUM value of index+Cmin
        Let x = (shape[d2.index]-1) + d2.Cmin;
//Widen descriptor, so that
//boundval will be covered.
        if(x > boundval)
            Result.Cmin-=(x-boundval);
    }
    Case: d2.IsSingleConstant( )
    {
        //similar processing to previous case
    }
    Default:
        Result = "*";
}
Case: Operator == "max"
{
    Case:     d1.IsConstantRange( )
        && d2.IsConstantRange( )
    {
        Result = {null + {max(d1.Cmin,d2.Cmin),
                max(d1.Cmax,d2.Cmax)}, B}
    }
    Case: d1.IsSingleConstant( )
    {
        Result = d2;
        //** Descriptor Widening
        //VALUE bounding against
        Let boundval = d1.Cmin;
        //MINIMUM value of index+Cmax
        // == Cmax, since minimum(index)=0
        Let x = d2.Cmax;
        //Must widen descriptor, so that
        //boundval will be covered.
        if(x < boundval)
            Result.Cmax += (boundval -x);
    }
    Case: d2.IsSingleConstant( )
    {
    //similar processing to previous case
    }
    Default:
        Result = "*";
}//end case "max"
}//end case Integer OpExpr
Case: DerefExpr
{
    //1. get the descriptors for the subscript expressions
    Descriptor Subscript[i] =
    SubscriptExpression[i].doanalysis(B,Iter,shape);
    //2. save the vector of descriptors !
    ArrayEdgeMap.Add ( target_Array, Subscript)
    //3. process the target array
    target_Array.doanalysis(B,Iter,shape);
    Result="*";
}
//Processing for Arrays
Case: ExprArray
{
    Result="*"
    //0. wait till all parents are processed
    If(!(All_parents_processed))
    end_processing;
    //1. Attempt to "coalesce" descriptors
    //from multiple parents
    Descriptor[ ] CoalescedDescriptor;
    bool coalesce_success=true;
    //1.5 the break node will never coalesce.
    if(this == B)
        coalesce_success=false;
    Foreach dimension i
    {
        Foreach Descriptor[ ] M in
                ArrayEdgeMap(This)
        {
            CoalscedDescriptor[i] =
                CreateCoalescedDescriptor
                    (Coalesce_Descriptor[i], M[i])
            if(CoalescedDescriptor[i] == "*")
                coalesce_success=false;
        }
    }
    //2. if coalescing succeeded, do not put a break here.
    if(coalesce_success)
    {
        //save the CoalescedDescriptor
        DescMap.Add(this,CoalescedDescriptor);
        //process child
        ChildExpression.doanalysis
            (B,CoalescedDescriptor,shape)
    }
    else
    {
        //3. coalescing failed. Put a break
        BreakSet.Add(this)
        //4. create a new vector in place of Iter
        Descriptor newIter[Rank];
        foreach dimension i
            newIter[i] = { i + {0,0}, this}
            ChildExpression.doanalysis(this,
                        newIter, this.shape)
    }
}//end case ExprArray
Case: ReductionArray
{
    Result = "*";
    //1. no coalescing, always put a break
    BreakSet.Add(this)
    //2. create a new "*" vector in place of Iter
    Descriptor newIter[Rank];
    foreach dimension i
    newIter[i] = "*";
    //3. process target array of reduction.
    target.doanalysis(this, newIter, this.shape)
}
Default:
    {
        Foreach Child Ch of this node
            Ch.doanalysis(B, Iter, shape)
        Result = "*";
    }
}//end of function doanalysis
doanalysis( ) is invoked with the root node R of the program
as: doanalysis(R, null,R.shape);
Support Functions:
1. Descriptor AddDescriptor(Descriptor d1, Descriptor d2)
Adds two descriptors. If either descriptor is "*", result
is "*". If the break nodes or index identifiers in the
descriptors do not match, result is "*".
2. bool IsConstantRange(Descriptor d1)
returns (d1.index == null)
3. bool IsSingleConstant(Descriptor d1)
returns (IsConstantRange(d1) && (d1.Cmin == d1.Cmax))
4. Descriptor createCoalescedDescriptor
        (Descriptor d1, Descriptor d2)
        {
            Descriptor Result;
//check for mismatch
case: d1 == "*" | d2 == "*"
Result = "*";
```

-continued

```
    case: d1.breakNode != d2.breakNode
    Result = "*";
    case: d1.index != d2.index
    Result = "*"
    case: d1.IsConstantRange( ) ||
    d2.IsConstantRange( )
    Result = "*"
    default:
        {
    //now coalesce descriptor
        int newCmin = Min(d1.Cmin, d2.Cmin)
        int newCmax = Max(d1.Cmax, d2.Cmax)
        Result = {d1.index +
                {newCmin, newCmax},
                d1.breakNode}
        }
    return Result;
}
```

For "min" and "max" operations, the processing is more involved, but these operations are supported because they appear in indexing expressions for subscripts inside DerefExpr nodes (otherwise information on the access pattern for that subscript would be lost). By way of example, consider the expression "min(999,i+3)". It would be incorrect to set the result descriptor to "i+{3,3}" in this case, because when i>996, the value of the expression is always 999, but the descriptor would not generate this value, and thus fail to faithfully represent the elements required from the target array being dereferenced.

To represent the effect of the min, the range of this descriptor is increased, to ensure that it always encompasses the bound value (999), whenever i>bound. This operation is referred to as widening the descriptor. Widening relies on the fact that the range of the index variable i is known, because i refers to a particular dimension of the break Array, whose shape is fixed. For example, if the maximum value of i is known to be 999, the widened descriptor would be "i+{0,3}". When i is in the range 996 to 999, the range of integer values encapsulated by the descriptor (i+0 to i+3) always includes the value 999 that would be generated by the expression min(999,i+3). The processing for the general case is shown in the pseudo code above; a similar treatment is needed for the "max" operation, and is also shown in the above pseudo code.

By performing the widening operation, the algorithm is able to represent the effect of the min and max operations, at the cost of losing precision. For example, in the previous example, min(999,i+3) always produces exactly one value for a particular value of i, while the descriptor produces four values (i, i+1, i+2, i+3). If the descriptor is used to generate elements of the non-break Array, it might end up generating elements which are not used by its parent Arrays. However, because the non-break Arrays are generated in a tiled manner, the computations are only redundant at the edge of the tile. If the block size is large, then the redundant computations do not significantly impact execution time.

DerefExpr and ReductionArray nodes are the only possible parents for an ExprArray node; a ReductionArray is described below. When a DerefExpr is processed, it collects the descriptors generated by the subscript expressions for each dimension of the target Array E into a vector and saves it. If E has p parents, it has access to p such descriptor vectors when it is finally processed.

Each descriptor vector is of length Rank(E). Each descriptor vector represents the values of the dimensions of E that will be needed by a particular parent. An attempt is made to coalesce these p descriptor vectors element-wise, to form a "coalesced" descriptor vector D. If the coalescing succeeds, then for each subscript i of E, D[i] represents the union of subscript values required by all of the parent nodes of the Array. During generation of the lower-level intermediate representation, only these subscript values will be instantiated. However, coalescing may fail if the descriptors from multiple parents are not compatible in at least one dimension. This may happen due to several reasons. For example, coalescing fails if any descriptor of any parent is "*". Coalescing also may fail if two or more descriptors have different index variables, or if they have different break nodes (function CreateCoalscedDescriptor in pseudo code).

If coalescing fails, a break is placed at this ExprArray node, and the children of the node processed with this node as the break node. The ExprArray node is also put in the BREAKSET. However, if coalescing succeeds, processing the children of the node continues, with the same break node as before. In this situation, coalesced descriptor vector D is saved in DESCMAP.

In one example implementation, a break is forced on a ReductionArray node. In addition, the descriptor vector for the target Array is set to "*" for each subscript of the target Array. When the target Array T is processed, this forces a break to also occur at T.

For example, consider the higher-level intermediate representation for Convolve as shown in FIG. 4. The descriptor analysis mechanism 124 is able to determine that there is only one break needed for the entire program, for the Result ExprArray. This is the minimum number of breaks possible. After processing, the state of the data structures is as follows:
BREAKSET={Result}
DESCMAP: SmoothX→D[2], where
D[1]={i1+{−1,1}, Result}, D[0]={i0+{0,0}, Result}
The descriptor vectors D[2] produced by each parent of SmoothX:
Parent Node 2:
D[1]={i1+{−1,0}, Result}, D[0]={i0+{0,0},Result}
Parent Node 3:
D[1]={i1+{0,0}, Result}, D[0]={i0+{0,0},Result}
Parent Node 4:
D[1]={i1+{0,1}, Result}, D[0]=({i0+{0,0},Result}

These descriptor vectors were coalesced element-wise to form the coalesced vector shown for SmoothX in the DESCMAP. Note the effect of widening in the D[1] descriptor of Nodes 2 and 4, due to the processing of "max" and "min" operations respectively.

Turning to an explanation of generation of the lower-level intermediate representation 122, the elements of the BREAKSET are processed in reverse order of their insertion. Each element is the root of a sub-graph in the higher-level intermediate representation 120. In general, each sub-graph executes in the same tiled loop nest in the lower-level intermediate representation 122. The non-break Arrays in the sub-graph will use the extents of the tiles to decide which values of the subscripts need to be instantiated, (where an extent is the total number of elements in a particular dimension). These vectors are stored in ArrayEdgeMap data structure, as shown in the pseudo code. Thus, BREAKSET is more appropriately implemented as a list or a vector, rather than as a set.

In one example implementation, in a general case, tiling an n-deep loop nest results in a loop nest of depth 2n. The outer n loops are called the controller loops, which iterate tile-by-tile, while the inner n loops (tile loops) do the processing for a particular tile. Note that there is not only one tile loop nest inside the controller loop nest; instead, each non-break Array generates all the required elements needed in the current iteration space tile. This is required because the non-break Array may appear several times in the computation in the sub-graph, with different indexing. Thus, if the sub-graph contains P non-break Arrays, there are P+1 tile loop nests (the additional tile loop nest is for the root of the sub-graph).

Unlike conventional tiling, the extents of the tile loop nests may be different for the computation of each non-break Array, because the coalesced descriptor for the non-break Array may have a non-zero $C_{min}$ value; (recall that a descriptor describes integer values relative to a particular index $i_x$ of the break Array, and the range of integer values that it denotes is $ix+C_{min}$ to $ix+C_{max}$). The maximum size of the non-break Array needed for processing a particular tile can be determined from the tile sizes for each loop and the coalesced descriptor (from DESCMAP) for that Array. This allows shrinking the amount of the memory allocated for the non-break Arrays, compared to their original shape. This not only saves memory, but if the non-break Array is small enough, provides that it may be resident in cache when the next tile is processed and will not need to be written back to memory for the duration of the computation.

Consider an example in which R is the current break Array being processed, whereby there are Rank(R) controller loops in the lower-level intermediate representation 122, one for each dimension of R. Let C be the vector of size Rank(R), where C[i], 0<=i<Rank(R) denotes the current iteration of the ith controller loop. Also, let T[i], 0<=i<Rank(R) contain the size of the tile for the ith loop. For a particular iteration tile, let Is and Ie be vectors of size Rank(R), containing the start and end values of each loop for this tile. Is and Ie can be determined as:

```
0<=m<Rank(R)
Is[m] = C[m]*T[m]
Ie[m] = Is[m] + T[m]-1.
```

The sub-graph is processed in a bottom up fashion. Given Is and Ie, each non-break (private) Array P in the sub-graph can know exactly the range of positions that need to be instantiated for each subscript of the P, by using the coalesced descriptor D stored in DESCMAP. Let Ps, Pe be a vector of size Rank(P) denoting the starting and ending position to be instantiated for each subscript.

```
0<= m < Rank(P)
Ps[m] = Is[ D[m].Index]+D[m].Cmin
Pe[m] = Ie[ D[m].Index] + D[m].Cmax
```

Ps and Pe are bounded to make sure that they always access legal elements as below:

```
0<=m<Rank(P)
Ps[m] = Min( P.Shape[m]-1, Max(0,Ps[m]))
Pe[m] = Min( P.Shape[m]-1, Max(0,Pe[m]))
```

For a particular non-break Array P, Ps and Pe denote the range of subscript positions in the terms of the original shape of P. As described above, because the values of the non-break Array are not reused across tiles, the effective size of the non-break Array may be shrunk. After shrinking, indexing functions are adjusted for P's dimensions (subscripts) to reflect this, by subtracting Ps from it. Conceptually, each tile can allocate its own version of the (shrunken) non-break Array.

The outermost loop of the controller loop nest is parallelized, using constructs (exemplified herein as "forall" constructs). The allocations of the non-break Arrays are taken out of the inner controller loops, to reduce performance overhead. Thus, each thread allocates its own version of all non-break Arrays.

By way of example, the lower-level intermediate representation 122 generated after non-break Array Instantiation is shown below. In the actual code, Is, Ie, Ps, Ps have been turned into scalars (for performance reasons), however for purposes of readability herein, they are retained them in array form in the below example:

```
in float a0[1000,1000];
out float r[1000,1000];
//1. Parallelized outer controller
forall (i < 16) {
    //2. Allocate private Array (SmoothX)
    new float t0[66,64];
    new int Is[2];
    new int Ie[2];
    new int Ps[2];
    new int Pe[2];
    loop (j < 16) {
        //3. Initialize Is, Ie
        Is[0] <- i * 64;
        Ie[0] <- Min(999,(Is[0]+63));
        Is[1] <- j * 64;
        Ie[1] <- Min(999,(Is[1]+63));
        //4. Initialize Ps, Pe
        Ps[0] = Is[0]-1;
        Pe[0] = Ie[0]+1;
        Ps[0] = Min(0,Max(999,Ps[0]));
        Pe[0] = Min(0,Max(999,Pe[0])+1;
        Ps[1] = Is[1];
        Pe[1] = Ie[1];
        Ps[1] = Min(0,Max(999,Ps[1]));
        Pe[1] = Min(0,Max(999,Pe[1])+1;
        //5. Create elements of private Array t0
        gfor(l= Ps[0]; l< Pe[0]) {
            gfor (m= Ps[1]; m < Pe[1]) {
                t0[l-Ps[0],m-Ps[1]] <-
                    a0[l, max(m-1,0)] * 0.05448868
                    + a0[l,m] * 0.2442013
                    + a0[l, min(m+1,999)] * 0.40262;
            }
        }
        new int t13, t14;
        t13 <- Ie[0]+1;
        t14 <- Ie[1] + 1;
        //6. Create elements of the result using t0
        gfor (l= Is[0]; l< t13) {
            gfor (m= Is[1]; m< t14) {
                r[l,m] <-
                    t0[max(l-1,0)-Ps[0], m-Ps[1]] * 0.05448868
                    + t0[l-Ps[0],m-Ps[1]] * 0.2442013
                    + t0[min(999,l+1)-Ps[0],m-Ps[1]] * 0.40262;
            }
        }
        free t0;
        free Is;
        free Ie;
        free Ps;
        free Pe;
}
```

The block size used was (64,64). Note that the size of the non-break array t0 is (66,64), because the descriptor for t0 in subscript 1 is {i1+{-1,1}}, so two extra subscript positions need to be calculated at the edges of the tile. The gfor is a more general version of the loop construct. Also note the subtraction by Ps in the definition and uses of t0, required to translate the original index values of t0 into tile-relative values.

As can be seen, an example implementation described above tries to use (privatize) as many non-break (private)

Arrays as possible. Because cache memory is finite, as more Arrays are privatized, the size of the tiles needs to decrease for the Arrays to remain resident in cache. However, smaller tile sizes have overhead, including that the non-break Arrays may compute redundant elements at the edge of the tile, which may also be contributed to by descriptor widening required for min and max operations. With smaller tiles, the fraction of those calculated that are redundant is higher. Also, smaller tile sizes have the overhead of extra loop control instructions. Thus, is may be desirable to limit the number of Arrays that can be privatized.

In addition, the placement of breaks can be improved for certain cases. For example, if a non-break Array candidate is much smaller than the parent Arrays where its elements will be used or has fewer dimensions, then it may be more desirable to completely instantiate the Array (i.e., place a break at the Array).

Further, the redundant operations at the edge may be calculated as a fraction of the tile size. If the percentage of elements that are redundant as a fraction of the tile size is beyond a certain threshold, a break may be forced at the Array.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a compilation environment, a method executed by a computing device comprising:
    detecting a series of loop nests corresponding to source code;
    processing a higher-level internal representation comprising a data structure corresponding to the source code, the processing including:
        splitting the data structure containing array nodes of a graph into sub-graphs containing break nodes and non-break array nodes, the break nodes obtained by placing break marks at one or more of the array nodes and where the break nodes are roots of the sub-graphs,
        completely instantiating the break nodes before their parent nodes are processed, and,
        for the non-break array nodes, instantiating only elements required for a current iteration space tile; and
    tiling the series of loop nests together.

2. The method of claim 1 wherein the data structure comprises a directed acyclic graph.

3. The method of claim 1 wherein the data structure comprises at least one expression node, and wherein processing the data structure comprises creating a descriptor for each expression node, where each descriptor represents an access pattern corresponding to values of subscripts needed by a particular parent node.

4. The method of claim 3 further comprising, coalescing at least two descriptors, including unioning elements of array subscripts required by a plurality of the parent nodes.

5. The method of claim 3 further comprising, attempting to coalesce at least two descriptors, including inserting a break node in the data structure if the attempt fails.

6. The method of claim 3 further comprising, widening the descriptor, including increasing at least one value of a range of the descriptor such that boundary conditions are not violated.

7. The method of claim 1 wherein tiling the series of loop nests together comprises generating elements such that a plurality of tile loop nests are within a controller loop.

8. The method of claim 1 wherein tiling the series of loop nests together comprises determining a number of one or more controller loops based on each dimension in a current sub-part representing an array, and determining start and end values of each loop for tiles in the controller loops by processing the sub-part to determine a range of positions for each subscript of the array.

9. The method of claim 1 wherein tiling the series of loop nests together comprises lowering the higher-level intermediate representation into a lower-level intermediate representation in which each sub-part executes in a common tiled loop nest.

10. The method of claim 9 wherein tiling the series of loop nests together comprises using extents of the tiles to decide which values of subscripts need to be instantiated.

11. The method of claim 1 wherein the data structure comprises a directed acyclic graph including at least one expression node, wherein processing the data structure comprises creating a descriptor for each expression node, where each descriptor represents values of subscripts needed by a particular parent node, and further comprising, coalescing at least two descriptors, and wherein tiling the loop nests together comprises determining a maximum size of an array for processing a particular tile using tile sizes for each loop and the coalesced descriptor for that array.

12. The method of claim 11 further comprising, shrinking an amount of the memory allocated for the array relative to its original size based on the maximum size determined.

13. The method of claim 1, wherein completely instantiating the break nodes includes completely instantiating the break nodes before their parent nodes are processed by computing elements of an expression array that does not have an allocation of memory and then storing these element values in a value array that has an allocated memory.

14. In a computing environment, a system comprising:
    a computing device;
    a computer program comprising program modules executable by the computing device, the computer program further comprising:
        a compiler that:
            (a) compiles source code into a higher-level intermediate representation comprising a data structure having nodes representing at least one array and at least one expression;
            (b) analyzes the nodes to generate analysis data representative of expression nodes;
            (c) splits the data structure containing array nodes of a graph into sub-graphs containing break nodes and non-break nodes, the break nodes obtained by placing break marks at one or more of the array nodes and where the break nodes are roots of the sub-graphs;
            (d) completely instantiates the break nodes before their parent nodes are processed;
            (e) lowers the higher-level intermediate representation into a low-level intermediate representation, including generating one or more controller loops for an array and a plurality of tiles within at least one of the controller loops from the analysis data; and
            (f) for the non-break nodes, instantiates only elements required for a current tile.

15. The system of claim 14 wherein each of the sub-graphs represents an array for which tiles may be generated.

16. The system of claim 14 wherein the compiler coalesces at least two sets of analysis data, including unioning elements of array subscripts required by a plurality of parent nodes, determines a maximum size of an array for processing a particular tile using tile sizes for each loop and the coalesced analysis data for that array, and allocates memory for the array relative to its original size based on the maximum size determined.

17. A computer-readable storage memory having computer-executable instructions stored thereon, which when executed transforms a series of loop nests into a plurality of tile loop nests within a set of controller loops, including determining which results from at least one tile loop nest need to be computed before another tile loop nest by splitting the data structure containing array nodes of a graph into sub-graphs containing break nodes and non-break array nodes, the break nodes obtained by placing break marks at one or more of the array nodes, where the break nodes are roots of the sub-graphs, completely instantiating the break nodes before their parent nodes are processed by computing elements of an expression array that does not have an allocation of memory and then storing these element values in a value array that has an allocated memory, and, for the non-break nodes, instantiating only elements required for a current tile.

18. The computer-readable storage memory of claim 17 wherein determining which results from at least one loop nest need to be computed before another loop nest comprises performing a dependency analysis to determine which later tile depends on a previous tile.

19. The computer-readable storage memory of claim 18 wherein performing the dependency analysis comprises processing a higher-level intermediate representation comprising a data structure corresponding to source code.

20. The computer-readable storage memory of claim 18 wherein transforming the series of loop nests comprises lowering a higher-level intermediate representation into a lower-level intermediate representation in which each sub-graph executes in a common tiled loop.

* * * * *